(12) United States Patent
Miyagi

(10) Patent No.: US 10,071,869 B2
(45) Date of Patent: Sep. 11, 2018

(54) MEDIUM FEEDER AND IMAGE READING APPARATUS

(71) Applicant: SEIKO EPSON CORPORATION, Tokyo (JP)

(72) Inventor: Yohei Miyagi, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 7 days.

(21) Appl. No.: 15/459,250

(22) Filed: Mar. 15, 2017

(65) Prior Publication Data

US 2017/0267476 A1 Sep. 21, 2017

(30) Foreign Application Priority Data

Mar. 18, 2016 (JP) ................. 2016-054956

(51) Int. Cl.

| B65H 9/04 | (2006.01) |
|---|---|
| B65H 9/08 | (2006.01) |
| H04N 1/00 | (2006.01) |
| B65H 3/54 | (2006.01) |
| B65H 3/68 | (2006.01) |
| B65H 3/66 | (2006.01) |
| B65H 3/06 | (2006.01) |

(52) U.S. Cl.
CPC ............. *B65H 9/04* (2013.01); *B65H 3/54* (2013.01); *B65H 9/08* (2013.01); *H04N 1/00588* (2013.01); *H04N 1/00602* (2013.01); *H04N 1/00615* (2013.01); *H04N 1/00628* (2013.01); *B65H 3/063* (2013.01); *B65H 3/66* (2013.01); *B65H 3/68* (2013.01); *B65H 2405/1142* (2013.01); *B65H 2801/39* (2013.01); *H04N 2201/0081* (2013.01)

(58) Field of Classification Search
CPC ... B65H 3/54; B65H 3/66; B65H 3/68; B65H 2405/1142; B65H 2405/11425; B65H 2405/1144; B65H 3/063
USPC .......................................................... 271/171
See application file for complete search history.

(56) References Cited

U.S. PATENT DOCUMENTS

| 9,630,792 B2 * | 4/2017 | Shiba ..................... B65H 5/068 |
| 9,772,593 B2 * | 9/2017 | Tematsu .......... G03G 15/6529 |
| 2013/0056924 A1 * | 3/2013 | Mizuno ................... B65H 1/00 |
| | | 271/162 |
| 2013/0056925 A1 * | 3/2013 | Hsu ......................... B65H 1/04 |
| | | 271/171 |

FOREIGN PATENT DOCUMENTS

| JP | 2001-106362 | 4/2001 |
| JP | 5810769 | 10/2015 |

* cited by examiner

*Primary Examiner* — Jeremy R Severson
(74) *Attorney, Agent, or Firm* — Workman Nydegger

(57) ABSTRACT

A medium feeder includes a medium mounter, a pair of edge guides, and a sheet number limiter. The medium mounter has a mounting surface on which a medium to be fed is placed. The pair of edge guides is provided at the medium mounter to guide side edges of the medium in a direction that intersects with a feeding direction in which the medium is fed. The sheet number limiter is provided at the pair of edge guides to limit the number of media mountable on the medium mounter. The sheet number limiter has an extension that extends in a feeding direction of the medium such that a distance between the extension and the mounting surface increases downstream.

9 Claims, 9 Drawing Sheets

MEDIUM FEEDER AND IMAGE READING APPARATUS

BACKGROUND

1. Technical Field

The present invention relates to a medium feeder for transporting a medium and an image reading apparatus having the medium feeder.

2. Related Art

Some types of scanners, as examples of image reading apparatuses, include an automatic document feeder (ADF) serving as a medium feeder for allowing multiple document sheets to be fed and scanned automatically. Such a medium feeder may have an edge guide that is provided at a medium tray on which a stack of document sheets to be fed is placed. The edge guide guides the side edge of the document sheet in a width direction parallel to the width of the document sheet. For example, a medium feeder disclosed in Japanese Patent No. 5,810,769 has an edge guide that is slidable in the width direction in accordance with the size of the document sheet.

A medium feeder often has an upper limit on the number of document sheets mountable on a medium tray to ensure proper feeding of the document sheet. When a medium tray or a feed tray is open at the top, such as disclosed in Japanese Patent No. 5,810,769, a user may set document sheets above the upper limit on the medium tray. Mounting document sheets above the upper limit on the medium tray may cause a so-called misfeed in which no document sheet is fed.

To prevent such an error, JP-A-2001-106362 discloses an upper limiter that is provided at an edge guide to limit the number of sheets being stacked on a medium tray.

In JP-A-2001-106362, media are inserted between the upper limiter and the mounting surface of the medium tray, and the number of media being stacked on the medium tray is limited when the upper limiter comes into contact with the top medium in the stack. However, there is likelihood that media may be inserted through a gap between the upper limiter and an apparatus housing from above the upper limiter without passing between the upper limiter and the mounting surface of the medium tray. In this case, the media may enter a nip section of feed rollers at an improper angle that causes a misfeed.

A contact surface of the upper limiter faces the mounting surface of the medium tray and comes into contact with the top medium in the stack. The gap between the upper limiter and the apparatus housing can be reduced or removed by elongating the contact surface in a downstream direction in which the medium is fed. However, the elongation of the contact surface increases friction with the medium caused when the medium is fed. The increased friction may also cause a misfeed.

SUMMARY

An advantage of some aspects of the invention is that a medium feeder for allowing a medium to be set properly so that the medium can be fed properly is provided.

An aspect of the invention provides a medium feeder including a housing, a feed roller provided in the housing to feed a medium, a medium mounter provided upstream of the feed roller and having a mounting surface on which the medium is placed, a pair of edge guides provided at the medium mounter to guide side edges of the medium in a direction that intersects with a feeding direction in which the medium is fed, and a sheet number limiter provided at least one of the pair of edge guides to limit the number of media mountable on the medium mounter. The sheet number limiter includes a contact portion that comes into contact with a top medium of the media when the number of the media placed on the medium mounter reaches the maximum number and an extension that extends from the contact portion toward the housing such that a distance between the extension and the mounting surface increases downstream.

It is noted that throughout the specification, a transporting direction in which the medium feeder transports the medium is referred to as downstream, and a direction opposite to the transporting direction is referred to as upstream. According to this aspect, the contact portion reduces or avoids the likelihood of media above a predetermined number being placed on the medium mounter. Further, the extension extending from the contact portion toward the housing reduces a gap between the sheet number limiter and the housing, thus reducing the likelihood of a medium being inserted incorrectly from above the sheet number limiter without passing between the contact portion and the mounting surface. Moreover, the extension extends in a direction that increases the distance between the extension and the mounting surface downstream. This feature reduces the likelihood of the medium coming into contact with the extension, thus reducing an increase in a transportation load or friction with the medium. As such, the media can be placed on the medium mounter properly and fed properly.

It is preferable that the medium feeder further include a separation roller arranged in combination with the feed roller to form a nip section therebetween that separates the media from each other by nipping the medium, and the extension intersects with a tangent line at the nip section between the feed roller and the separation roller to prevent a rear edge of the medium having a stiffness greater than a predetermined value from coming into contact with the extension when a front edge in a long side direction of the medium is nipped by the nip section.

When the front edge of the medium having a high stiffness is nipped by the nip section between the feed roller and the separation roller, the rear edge side of the medium may be sprung upward. The extension intersects with the tangent line at the nip section to prevent the rear edge of the medium from coming into contact with the extension when the front edge in a long side direction of the medium having a stiffness greater than a predetermined value is nipped by the nip section. Thus, even if the medium being fed has a stiffness high enough to cause its rear edge side to be sprung upward when its front edge is nipped by the nip section, the increase in friction to be caused in the feeding can be prevented.

It is preferable that, when the medium having the stiffness greater than a predetermined value is inserted through a gap between the housing and an end of the extension, the nip section between the feed roller and the separation roller of the medium feeder fail to nip the front edge of the medium.

As such, even when the medium having such a predetermined stiffness is inserted through the gap between the housing and the end of the extension, that is, inserted incorrectly from above the sheet number limiter without passing between the contact portion and the mounting surface, the front edge of the medium is not nipped by the nip section between the feed roller and the separation roller. Accordingly, the likelihood of the occurrence of feeding the medium inserted from an incorrect position is avoided.

It is preferable that the medium having the predetermined stiffness be a card or a business card. According this aspect, a card or a business card having a high stiffness can be fed properly due to the effects above.

It is preferable that the sheet number limiter of the media feeder, further include a lead portion provided upstream of the contact portion and the lead portion have a shape that leads the medium to a space between the contact portion and the mounting surface.

The lead portion of the sheet number limiter facilitates setting up of the medium in the space between the contact portion and the mounting surface. For example, even when the medium has warpage, the medium can be inserted easily in the space between the contact portion and the mounting surface.

It is preferable that the lead portion be movable.

This feature can allow the lead portion to be moved according to factors, including the degree of warpage of the medium and the preference of a user, thus improving usability.

It is preferable that at least one of the contact portion and the extension have an auxiliary roller that is rotatable by the medium being fed while keeping in contact with the medium.

The auxiliary roller reduces the friction caused when the medium being fed comes into contact with the contact portion or the extension.

Another aspect of the invention provides an image reading apparatus including a reader that reads a medium and the medium feeder that feeds the medium toward the reader.

According to this aspect, the image reading apparatus including a reader that reads a medium has the advantage of the medium feeder which feeds the medium toward the reader.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
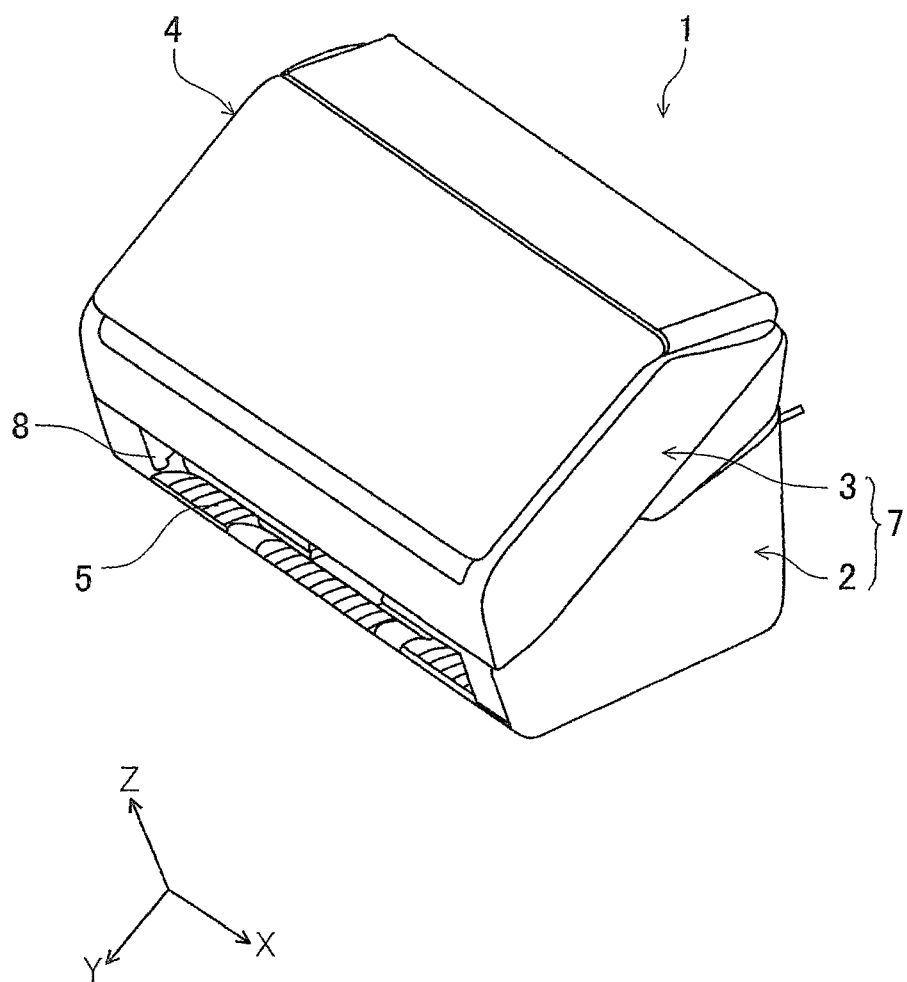
FIG. 1 is an external perspective view illustrating a scanner according to embodiments of the invention.
Figure 2:
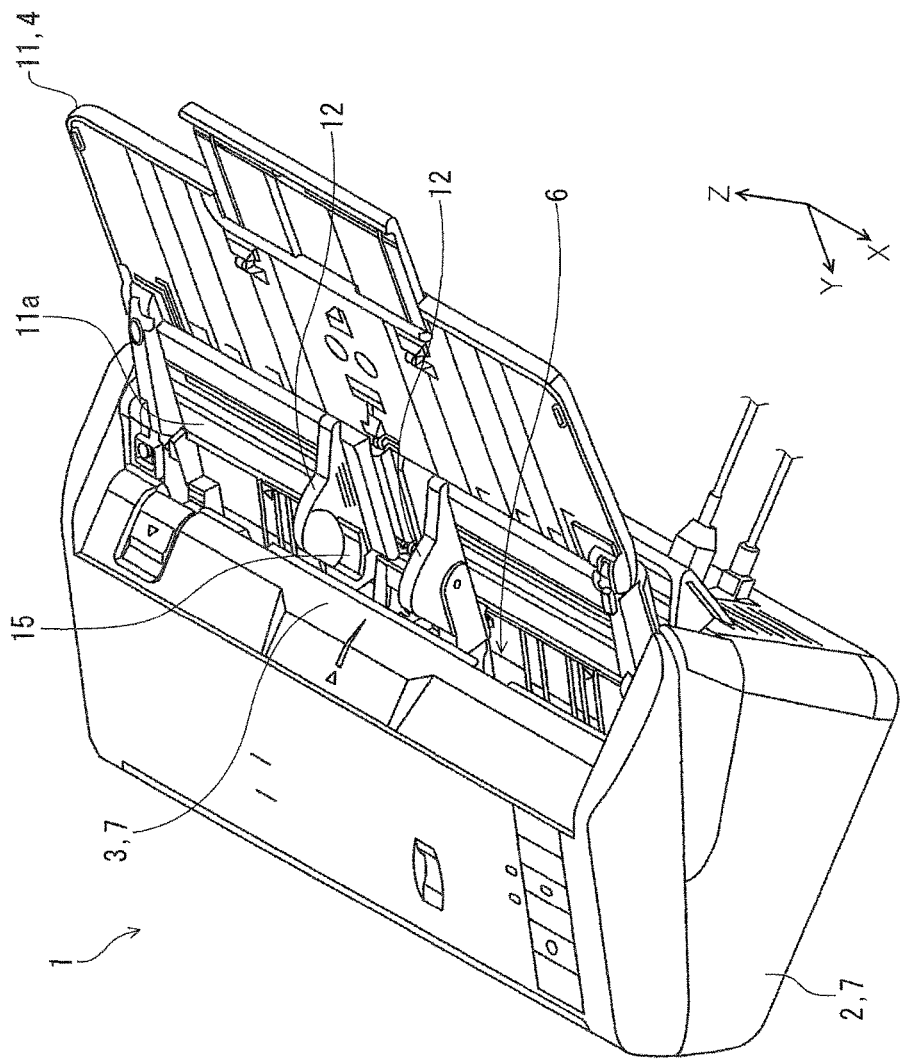
FIG. 2 is a perspective view illustrating a feeding condition of the scanner.
Figure 3:
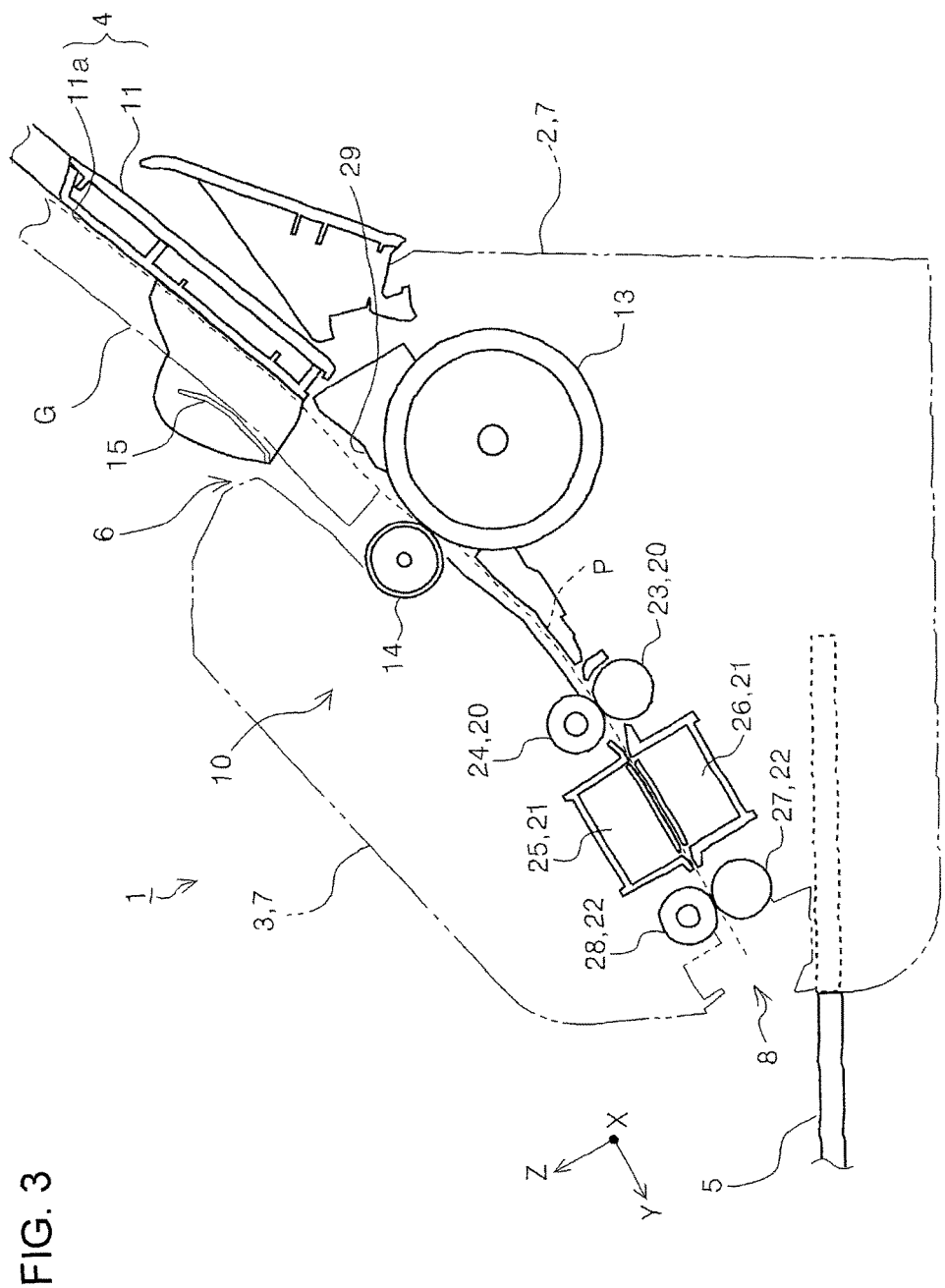
FIG. 3 is a sectional side view illustrating a sheet transportation path in the scanner.
Figure 4:
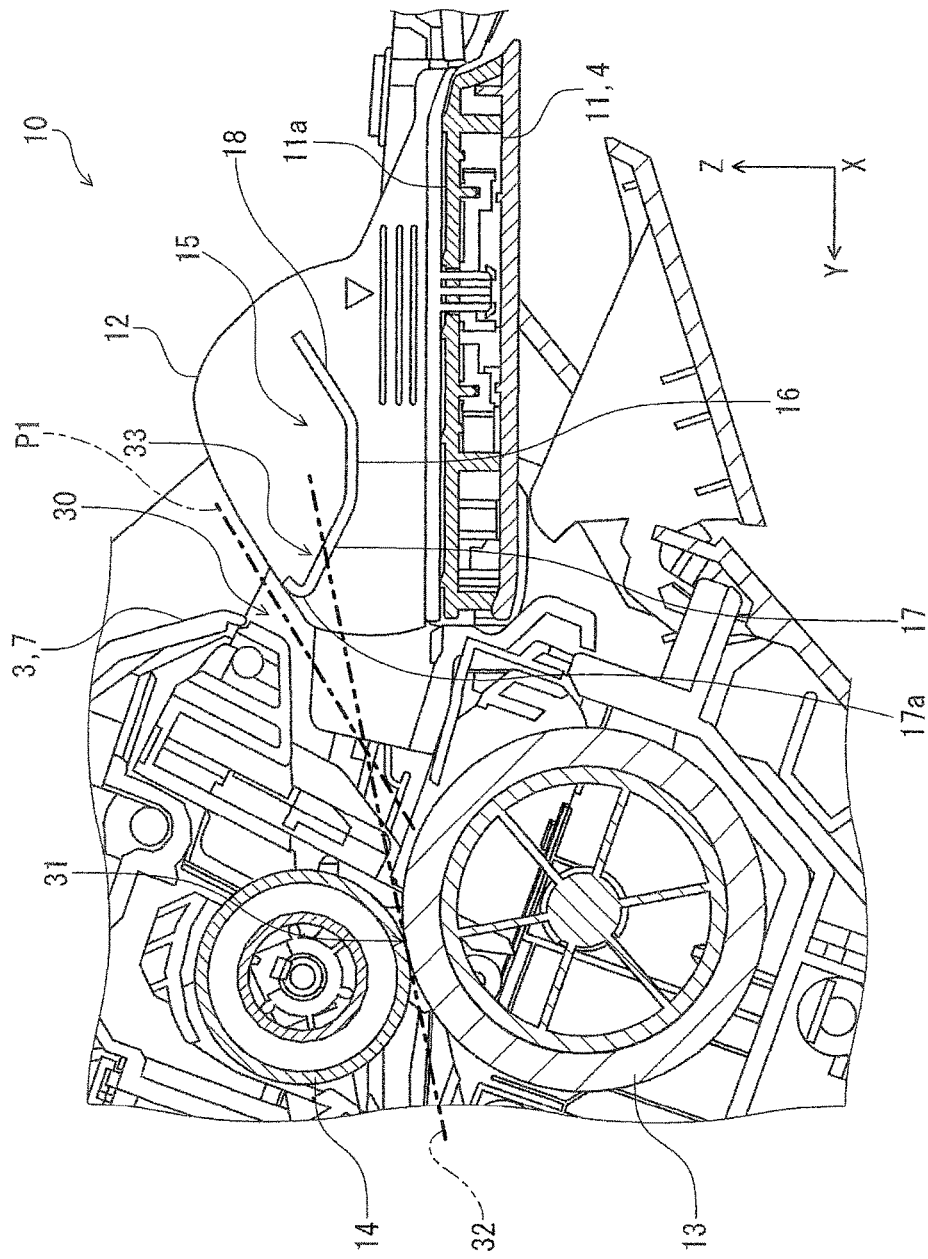
FIG. 4 is a sectional side view illustrating a medium feeder according to a first embodiment.
Figure 5:
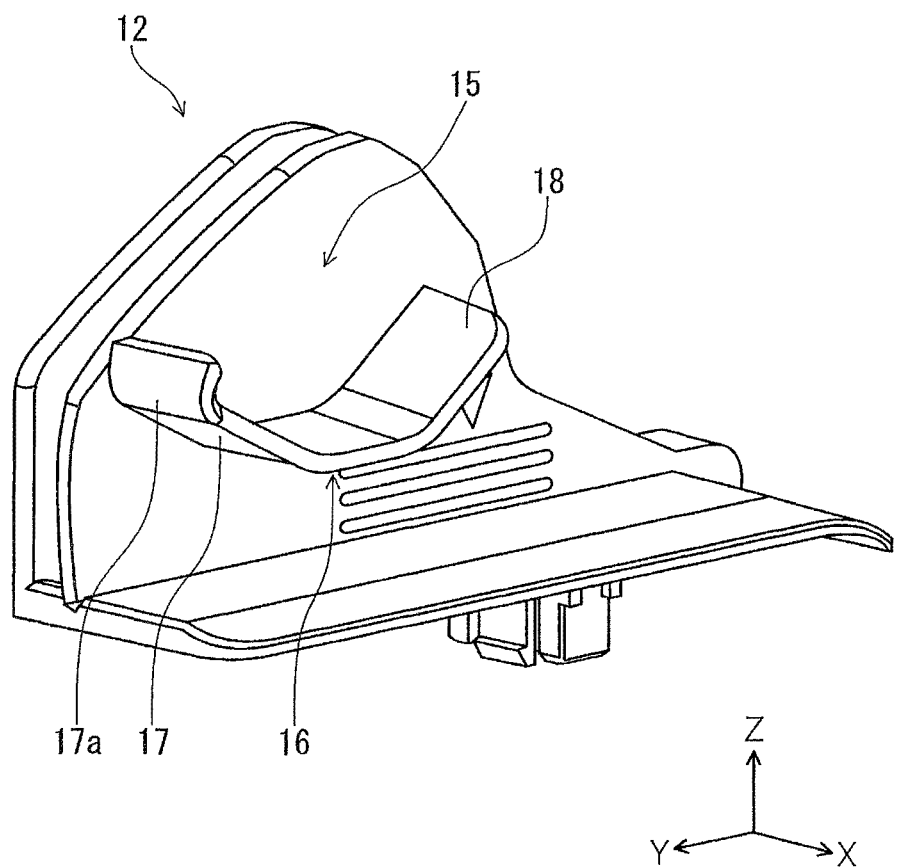
FIG. 5 is a perspective view illustrating an edge guide according to the first embodiment.
Figure 6:
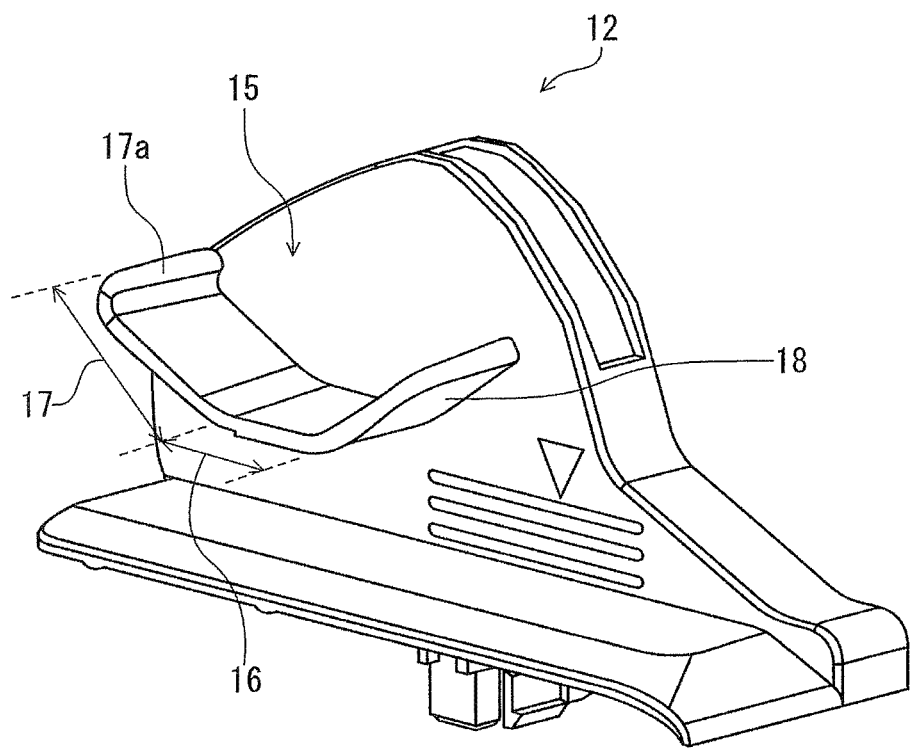
FIG. 6 is a perspective view illustrating the edge guide according to the first embodiment.

An image reading apparatus having a medium feeder according to a first embodiment of the invention is described below. Here, a document scanner (hereinafter referred to simply as a scanner 1) capable of reading at least one of the front and back surfaces of a medium is taken as an example to describe the image reading apparatus. FIG. 1 is an external perspective view illustrating the scanner 1. FIG. 2 is a perspective view illustrating a feeding condition of the scanner 1. FIG. 3 is a sectional side view illustrating a sheet transportation path in the scanner 1. FIG. 4 is a sectional side view illustrating a medium feeder according to the first embodiment. FIGS. 5 and 6 are perspective views illustrating an edge guide according to the first embodiment.

Scanner Outline

The scanner 1 (refer to FIG. 1) includes a medium feeder 10 (refer to FIG. 4) for feeding a paper sheet P as a medium. The scanner 1 has an appearance defined by a housing 7 and an opening/closing member 4. The housing 7 includes a lower unit 2 and an upper unit 3. The opening/closing member 4 opens and closes the top of the upper unit 3 and a feed slot 6 (refer to FIG. 2). As shown in FIG. 3, the medium feeder 10 includes the housing 7, a feed roller 13 provided inside the housing 7, a medium mounter 11 on which the paper sheet P is placed, and a pair of edge guides 12 (refer to FIG. 2) provided at the medium mounter 11. Each edge guide 12 has a sheet number limiter 15 for limiting the number of paper sheets P being placed on a mounting surface 11a of the medium mounter 11. The components of the medium feeder 10 are described in turn below.

In an XYZ-coordinate system illustrated in the drawings, an X direction represents a width direction parallel to the width of the scanner 1 and the width of the paper sheet P, and a Y direction represents a transportation direction in which the paper sheet P is transported. A Z direction intersects with the Y direction and is substantially perpendicular to the surfaces of the paper sheet P being transported. A direction from the rear to the front of the scanner 1 is referred to as a +Y direction, and a direction from the front to the rear of the scanner 1 is referred to as a −Y direction. A direction from the left to the right seen from the front of the scanner 1 is referred to as a +X direction, and a direction from the right to the left seen from the front of the scanner 1 is referred to as a −X direction. A direction from the bottom (including the bottom portion and the bottom surface) to the top (including the top portion and the top surface) of the scanner 1 is referred to as a +Z direction, and a direction from the top to the bottom of the scanner 1 is referred to as a −Z direction. In the scanner 1, the paper sheet P as a medium is transported in the +Y direction. In the description below, the transportation direction in which the paper sheet P is transported, that is, the +Y direction is referred to as downstream, and the direction opposite to the transportation direction, that is, the −Y direction is referred to as upstream.

The upper unit 3 is rotatably attached to the lower unit 2 and pivots on a downstream portion of the upper unit 3. Thus, the upper unit 3 rotates relative to the lower unit 2. The upper unit 3 has a closed state (refer to FIG. 2) and an open state (not shown). In the closed state, the upper unit 3 is closed relative to the lower unit 2 so that a transportation path through which the paper sheet P is transported can be defined by the lower unit 2 and the upper unit 3. In the open state, the upper unit 3 rotates relative to the lower unit 2 toward the front of the scanner 1 so as to expose the sheet transportation path. Thus, the open state allows a jammed paper sheet P to be removed easily.

The opening/closing member 4 is rotatably attached to the lower unit 2 and pivots on the upper portion of the back of the lower unit 2 to open and close the top of the upper unit 3. When the opening/closing member 4 opens the top of the upper unit 3, the opening/closing member 4 serves as the medium mounter 11 on which the paper sheet P is placed. Specifically, the opening/closing member 4 as the medium mounter 11 has a non-feed state shown in FIG. 1 and a feed state shown in FIG. 2. In the non-feed state, the opening/closing member 4 covers the top of the upper unit 3 and the feed slot 6 (refer to FIGS. 2 and 3). The opening/closing member 4 changes from the non-feed state to the feed state by rotating toward the back of the scanner 1. In the feed state, the opening/closing member 4 opens the feed slot 6 and serves as the medium mounter 11 for supporting the paper sheet P on the mounting surface 11a which is the inner surface of the opening/closing member 4.

As shown in FIG. 2, the pair of edge guides 12 is provided at the medium mounter 11 and guides both side edges of the paper sheet P in the width direction (that is, in the X direction). The edge guides 12 slide in the X direction according to the size of the paper sheet P. According to the present embodiment, the edge guides 12 move in opposite directions to each other. For example, when one of the edge guides 12 moves in the +X direction, the other of the edge guides 12 moves in the −X direction by following the movement of the one of the edge guides 12. As such, the paper sheet P is centered in the medium mounter 11 in the width direction and fed by a so-called center alignment feeding system.

The medium mounter 11 is provided at the lower unit 2. A downstream side (that is, the +Y direction side) of the medium mounter 11 is positioned inside the housing 7, and an upstream side (that is, the −Y direction side) of the medium mounter 11 is positioned outside the housing 7. The edge guides 12 are provided at portions of the medium mounter 11 that are positioned outside the housing 7.

Sheet Transportation Path in Scanner

Next, the sheet transportation path in the scanner 1 is described with reference to FIG. 3. In FIG. 3, a broken line represents the sheet transportation path for the paper sheet P. The paper sheet P is set in the feed slot 6 in such a manner that the front end side (that is, the downstream side) of the paper sheet P is supported and placed on the mounting surface 11a of the medium mounter 11 (that is, the opening/closing member 4 opening the feed slot 6).

A predetermined number of paper sheets P can be set in the feed slot 6. A reference G shown in FIG. 3 represents a paper stack having the maximum number of paper sheets P mountable on the medium mounter 11. As the number of paper sheets P being placed increases, the load on the feed roller 13 increases with the weight of the paper sheets P. The increased load may prevent the paper sheets P from being separated from each other between the feed roller 13 and a separation roller 14, causing a multifeed error in which more than one paper sheet P are fed at a time. To prevent such a multifeed error caused by the weight of the paper sheets P, the medium feeder 10 has an upper limit (that is, the maximum number of paper sheets P) on the number of paper sheets P mountable on the medium mounter 11. According to the present embodiment, each of the edge guides 12 has one sheet number limiter 15 for limiting the number of paper sheets P being placed on the mounting surface 11a. Thus, the sheet number limiter 15 prevents the paper sheets P above the upper limit from being placed on the medium mounter 11. The structure of the sheet number limiter 15 is described in more detail later.

The paper sheets P set in the feed slot 6 are fed toward an image reader 21 by the medium feeder 10. According to the present embodiment, the medium feeder 10 includes the feed roller 13 and the separation roller 14. The separation sheet separates the paper sheets P from each other by nipping one paper sheet P in combination with the feed roller 13. The feed roller 13 is rotatably attached to the lower unit 2. The paper sheets P placed on the medium mounter 11 are picked up by the feed roller 13 and fed downstream, that is, in the +Y direction. Specifically, the feed roller 13 rotates while keeping in contact with a surface of the paper sheet P facing the mounting surface 11a, thereby feeding the paper sheet P downstream. As such, when multiple paper sheets P are set in the feed slot 6, the set paper sheets P are fed downstream one by one in order of nearest to farthest from the mounting surface 11a of the medium mounter 11. The feed roller 13 partially protrudes with respect to a paper transportation surface 29.

A transport roller pair 20, the image reader 21 for reading an image, and a discharge roller pair 22 are provided downstream of the feed roller 13. The paper sheet P nipped between the feed roller 13 and the separation roller 14 and fed downstream is nipped by the transport roller pair 20 and transported to the image reader 21 which is located downstream of the transport roller pair 20.

The transport roller pair 20 includes a driving transport roller 23 provided at the lower unit 2 and a driven transport roller 24 provided at the upper unit 3. The driven transport roller 24 rotates with the rotation of the driving transport roller 23.

The image reader 21 includes an upper image sensor 25 provided at the upper unit 3 and a lower image sensor 26 provided at the lower unit 2. According to the present embodiment, for example, the upper image sensor 25 and the lower image sensor 26 are each a contact image sensor module (CISM).

The image reader 21 reads an image on at least one of the front surface and the back surface of the paper sheet P, and then the discharge roller pair 22, which is located downstream of the image reader 21, nips and discharges the paper sheet P to a discharge slot 8 of the lower unit 2. The discharge slot 8 is provided on the front of the scanner 1. The lower unit 2 has a discharge tray 5 that can be pulled out from the discharge slot 8 toward the front of the scanner 1. The discharge tray 5 has a stored state shown in FIG. 1 and a pulled-out state shown in FIG. 3. In the stored state, the discharge tray is stored in the bottom of the lower unit 2. In the pulled-out state, the discharge tray is pulled out toward the front of the scanner 1. The paper sheet P being discharged from the discharge slot 8 is stacked on the discharge tray 5 in the pulled-out state.

According to the present embodiment, the discharge roller pair 22 includes a driving discharge roller 27 provided at the lower unit 2 and a driven discharge roller 28 provided at the upper unit 3. The driven discharge roller 28 rotates with the rotation of the driving discharge roller 27. According to the present embodiment, the feed roller 13, the driving transport roller 23, and the driving discharge roller 27 are driven and rotated by at least one driving source (not shown) provided inside the lower unit 2.

Sheet Number Limiter

Next, the structure of the sheet number limiter 15 provided at the edge guide 12 is described with reference to FIGS. 4-6. As already mentioned, according to the present embodiment, each of the edge guides 12 has one sheet number limiter 15. Since the two edge guides 12 have a symmetric structure with respect to the Y-Z plane, one edge guide 12 is taken as an example to describe the structure. Here, the edge guide 12 on the left (on the +X direction side) when viewed from the front of the scanner 1 is taken as the example.

The sheet number limiter 15 (refer to FIG. 4) has a contact portion 16 (refer to FIGS. 5 and 6) that comes into contact with the top paper sheet P in the paper stack G when the paper stack G has the maximum number of paper sheets P mountable on the medium mounter 11. The contact portion 16 has a surface substantially parallel to the mounting surface 11a. The contact portion 16 limits a space above the mounting surface 11a, thereby limiting the number of paper sheets P placed on the mounting surface 11a. As such, the contact portion 16 reduces or avoids the likelihood of the paper sheets P above a predetermined maximum number of paper sheets P being placed on the medium mounter 11. The maximum number of paper sheets P mountable on the medium mounter 11 depends on the type of the paper sheet P, or more specifically, the thickness of the paper sheet P.

The sheet number limiter 15 further has a lead portion 18 (refer to FIGS. 5 and 6) provided upstream of the contact portion 16. The lead portion 18 has a shape that leads the paper sheet P to the space between the contact portion 16 and the mounting surface 11a. Specifically, the lead portion 18 is formed as a slope inclined downward from the upstream side to the downstream side, and a downstream end of the lead portion 18 is continuously connected to an upstream end of the contact portion 16. Since the lead portion 18 is continuously connected to the contact portion 16, the paper stack G can be easily set in the space between the contact portion 16 and the mounting surface 11a. For example, even when the paper stack G includes warping paper sheets S, the paper stack G is led by the lead portion 18 and thus easily inserted in the space between the contact portion 16 and the mounting surface 11a.

The sheet number limiter 15 further has an extension 17 that extends from the contact portion 16 toward the upper unit 3 of the housing 7 so that the distance between the extension 17 and the mounting surface 11a increases downstream. In other words, the extension 17 is formed as a slope inclined upward from the upstream side to the downstream side.

As such, the extension 17 is provided downstream of the contact portion 16 to fill a gap 30 between the sheet number limiter 15 and the upper unit 3. If the gap 30 between the sheet number limiter 15 and the upper unit 3 is large, there is likelihood that when a user is setting the paper sheet P on the medium mounter 11, the paper sheet P may be inserted in the gap 30 from above the sheet number limiter 15 without passing between the sheet number limiter 15 and the mounting surface 11a. This may be more likely to occur when the paper sheet P has a small size like a card or a business card. According to the present embodiment, the extension 17 of the sheet number limiter 15 narrows the gap 30, thereby reducing the likelihood of the paper sheet P being inserted incorrectly from above the sheet number limiter 15 without passing between the contact portion 16 and the mounting surface 11a.

When the paper sheet P being fed is nipped by a nip section 31 between the feed roller 13 and the separation roller 14, the rear edge side of the paper sheet P positioned upstream of the nip section 31 may be sprung upward. If the rear edge of the paper sheet P comes into contact with the sheet number limiter 15, a transportation load or friction increases accordingly. The increased transportation load prevents the paper sheet P from being transported properly. According to the present embodiment, the extension 17 extends from the contact portion 16 upward toward the upper unit 3 of the housing 7 so that the distance between the extension 17 and the mounting surface 11a increases downstream. This structure reduces the likelihood of the rear edge of the paper sheet P coming into contact with the extension 17, thus reducing an increase in the transportation load. As such, the sheet number limiter 15 allows the paper sheet P or the paper stack G to be placed properly on the medium mounter 11 and to be fed properly.

Next, the extension 17 of the sheet number limiter 15 is described in more detail below. As described above, the extension 17 extends from the contact portion 16 to fill the gap 30 between the sheet number limiter 15 and the upper unit 3. Further, as shown in FIG. 4, the extension 17 intersects with a tangent line 32 at the nip section 31 between the feed roller 13 and the separation roller 14. The gap 30 can be almost entirely removed as necessary. However, when the medium mounter 11 needs to be rotated to serve as the opening/closing member 4 like in the present embodiment, it may be preferable not to entirely remove the gap 30. If the gap 30 remains, the extension 17 intersecting with the tangent line 32 reduces the likelihood of the paper sheet P that is being inserted directly through the gap 30 being nipped by the nip section 31. For example, when the paper sheet P has a high stiffness, the paper sheet P may be inserted through the gap 30 without being warped. In such a case, the extension 17 intersecting with the tangent line 32 reduces the likelihood of the paper sheet P being nipped by the nip section 31 between the feed roller 13 and the separation roller 14.

Further, the extension 17 is formed so that, when the front edge of a paper sheer P1 having a stiffness greater than a predetermined value is nipped by the nip section 31, the rear edge of the paper sheer P does not come into contact with the extension 17. For example, the paper sheet P1 has the same size as a card or a business card. Specifically, for the paper sheet P1 having the same size as a card or a business card, the distance from the nip section 31 to a point 33 of intersection between the tangent line 32 and the extension 17 is set large enough to prevent the rear edge of the paper sheet P1 from coming into contact with the extension 17 when the front edge of the paper sheet P1 is nipped. When the front edge of the paper sheet P1 having a high stiffness like a card or a business card is nipped by the nip section 31, the rear edge side of the paper sheet P1 is likely spring upward and less likely warp due to its high stiffness. Accordingly, the rear edge of the paper sheet P1 is likely to come into contact with the sheet number limiter 15 above. According to the present embodiment, the extension 17 is formed so as to reduce the likelihood of the rear edge of the paper sheet P1 coming into contact with the extension 17, thus preventing the friction from increasing when the paper sheet P1 is being fed.

Further, according to the present embodiment, when the paper sheet P1 having a stiffness greater than a predetermined value is inserted in the gap 30 almost directly without being warped, the paper sheet P1 is inserted at an angle that causes the front edge of the paper sheet P1 to come into contact with the feed roller 13 at a position upstream of the nip section 31, thus preventing the nip section 31 between the feed roller 13 and the separation roller 14 from nipping the front edge of the paper sheet P1. This approach prevents the paper sheet P1 being inserted incorrectly from above the sheet number limiter 15 from being fed.

The downstream end of the extension 17 has a curved portion 17a. The curved portion 17a allows the paper sheet P1 being inserted through the gap 30 to come into contact with the feed roller 13 at a large angle compared to when the downstream end of the extension 17 extends linearly without the curved portion 17a. In other words, the curved portion 17a allows the paper sheet P1 being inserted through the gap 30 to come into contact with the feed roller 13 at a more upstream position. Thus, the curved portion 17a can reliably reduce the likelihood of the front edge of the paper sheet P1 that is being inserted through the gap 30 being nipped by the nip section 31.

According to the present embodiment, the sheet number limiter 15 including the contact portion 16, the extension 17, and the lead portion 18 is a single piece with the edge guide 12. Alternatively, the sheet number limiter 15 as a separate piece from the edge guide 12 may be added to the edge guide 12.

According to the present embodiment, the medium feeder 10 employs a center alignment feeding system that moves the edge guide 12 in opposite directions to each other so that the paper sheet P can be centered in the width direction. Alternatively, the medium feeder 10 can employ a single-side alignment feeding system that moves only one edge guide 12 in one direction so that the paper sheet P can be aligned to one side in the width direction. Although each of the edge guides 12 preferably has the sheet number limiter 15, only one of the edge guides 12 may have the sheet number limiter 15. The lead portion 18 may be omitted from the sheet number limiter 15.

Second Embodiment

Figure 7:
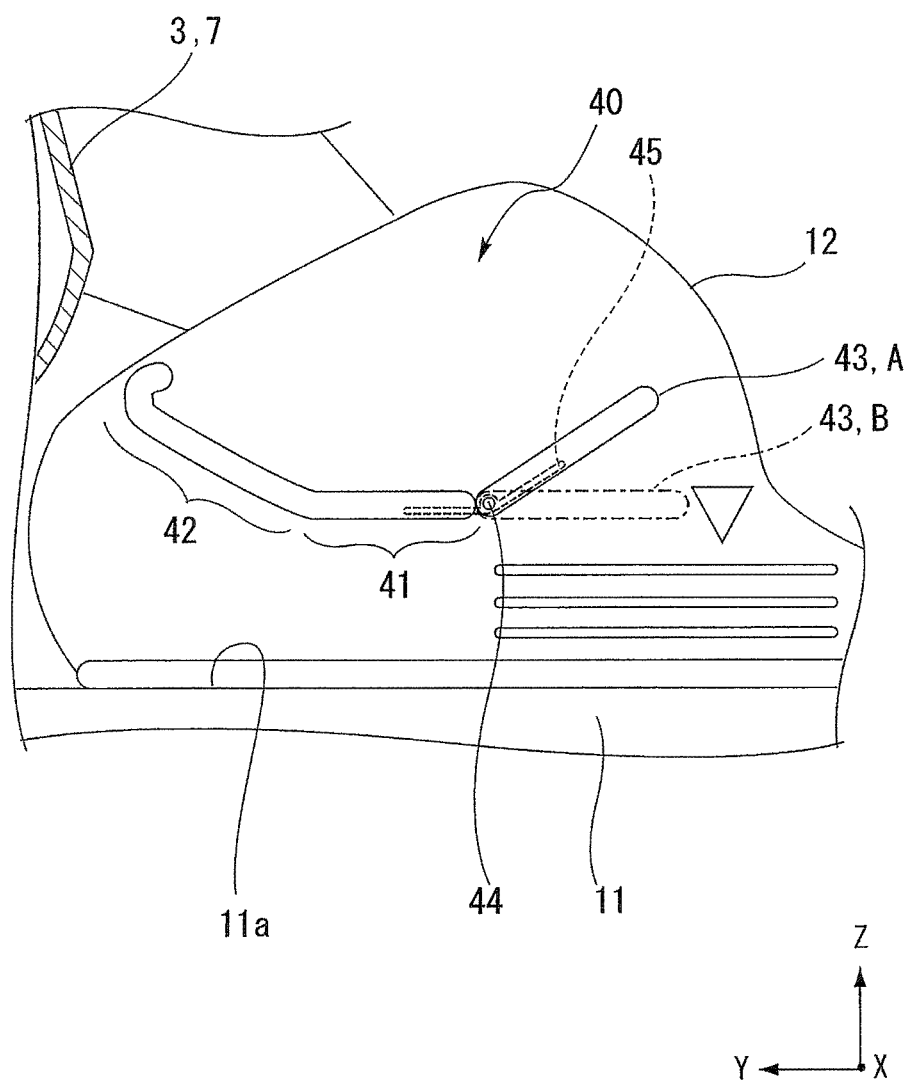
FIG. 7 is a schematic side view illustrating a sheet number limiter of a medium feeder according to a second embodiment.

In a second embodiment, another example of a sheet number limiter of a medium feeder is described with reference to FIG. 7. FIG. 7 is a schematic side view illustrating a sheet number limiter 40 of a medium feeder according to the second embodiment. Features similar to those described in the first embodiment are represented by the same reference characters as in the first embodiment and are not described. The sheet number limiter 40 has a lead portion 43. Unlike the lead portion 18 of the first embodiment, the lead portion 43 is movable.

The sheet number limiter 40 further has a contact portion 41 and an extension 42. The contact portion 41 comes into contact with the top paper sheet P in the paper stack G when the paper stack G has the maximum number of paper sheets P mountable on the medium mounter 11. The extension 42 extends toward the upper unit 3 of the housing 7 so that the distance between the extension 42 and the mounting surface 11a increases downstream. The contact portion 41 and the extension 42 are formed as a single piece with the edge guide 12. The functions of the contact portion 41 and the extension 42 are respectively the same as those of the contact portion 16 and the extension 17 of the first embodiment.

In the sheet number limiter 40, the lead portion 43 is provided upstream of the contact portion 41. The lead portion 43 rotates on a rotary shaft 44 to move between two positions: a position A denoted by a solid line and a position B denoted by a dot-and-dash line in FIG. 7. The rotary shaft 44 is provided with a torsion coil spring 45. The lead portion 43 is moved from the position A to the position B against the biasing force of the torsion coil spring 45. The lead portion 43 can be fixed to the position B by a fixing member (not shown) such as a snap-fit joint. The lead portion 43 returns to the position A by the biasing force of the torsion coil spring 45 when no longer fixed.

The lead portion 43 is set to the position A, for example, to set the paper sheet P on the medium mounter 11. In the position A, the lead portion 43 has a shape that leads the paper sheet P to the space between the contact portion 41 and the mounting surface 11a, thus facilitating setting up of the paper sheet P in the space between the contact portion 41 and the mounting surface 11a. After the paper sheet P has been set on the medium mounter 11, the lead portion 43 is set to the position B to achieve the same function as the contact portion 41. According to the present embodiment, the lead portion 43 is set to the position A or the position B. Alternatively, in addition to the position A and the position B, the lead portion 43 can be set or fixed to any position between the position A and the position B.

Third Embodiment

Figure 8:
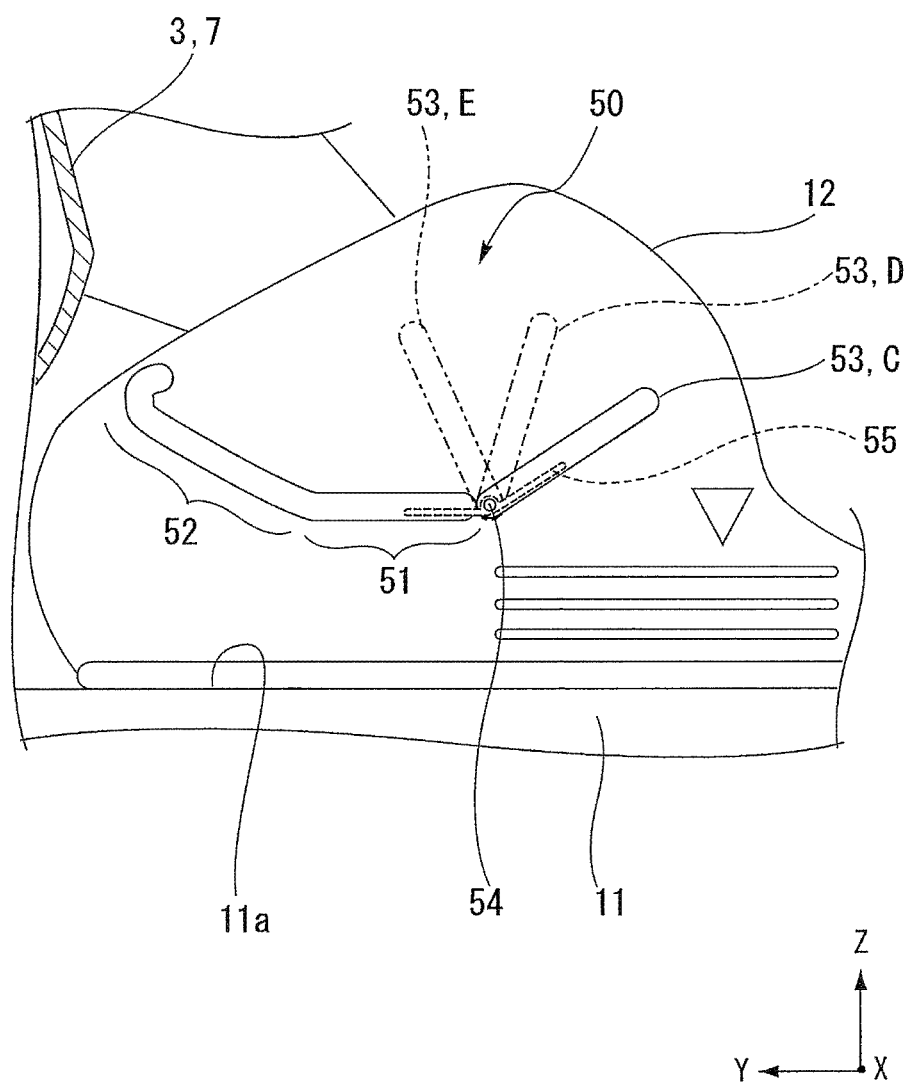
FIG. 8 is a schematic side view illustrating a sheet number limiter of a medium feeder according to a third embodiment.

In a third embodiment, still another example of a sheet number limiter of a medium feeder is described with reference to FIG. 8. FIG. 8 is a schematic side view illustrating a sheet number limiter 50 of a medium feeder according to the third embodiment. Features similar to those described in the second embodiment are represented by the same reference characters as in the second embodiment and are not described. The sheet number limiter 50 has a contact portion 51, an extension 52, and a lead portion 53. Like the lead portion 43 of the second embodiment, the lead portion 53 is movable.

The lead portion 53 rotates on a rotary shaft 54 to move among three positions: a position C denoted by a solid line, a position D denoted by a dot-and-dash line, and a position E denoted by a two-dot-dash line in FIG. 8. The rotary shaft 44 is provided with a torsion coil spring 55 that produces a biasing force to move the lead portion 53.

The lead portion 53 is set to the position C, for example, to set the paper sheet P on the medium mounter 11. In the position C, the lead portion 53 has a shape that leads the paper sheet P to the space between the contact portion 51 and the mounting surface 11a, thus facilitating setting up of the paper sheet P in the space between the contact portion 51 and the mounting surface 11a. When the paper sheet P to be set on the medium mounter 11 has a large amount of warpage, the lead portion 53 is preferably moved from the position C to the position D. Since the position D is higher than the position C, the paper sheet P having a large amount of warpage can be set more easily.

Further, setting the lead portion 53 to the position E increases the area of part of the edge guide 12 to be held with a hand or pinched with fingers when sliding the edge guide 12 in the sheet width direction (that is, in the X direction). Thus, the position E allows a user to hold the edge guide 12 easily. The lead portion 53 may be moved, beyond the position C, to a position corresponding to the position B in the second embodiment. Since the lead portion 53 of the third embodiment is movable like the lead portion 43 of the second embodiment, the lead portion 53 can be moved according to factors including the degree of warpage of the medium and the preference of a user.

Fourth Embodiment

Figure 9:
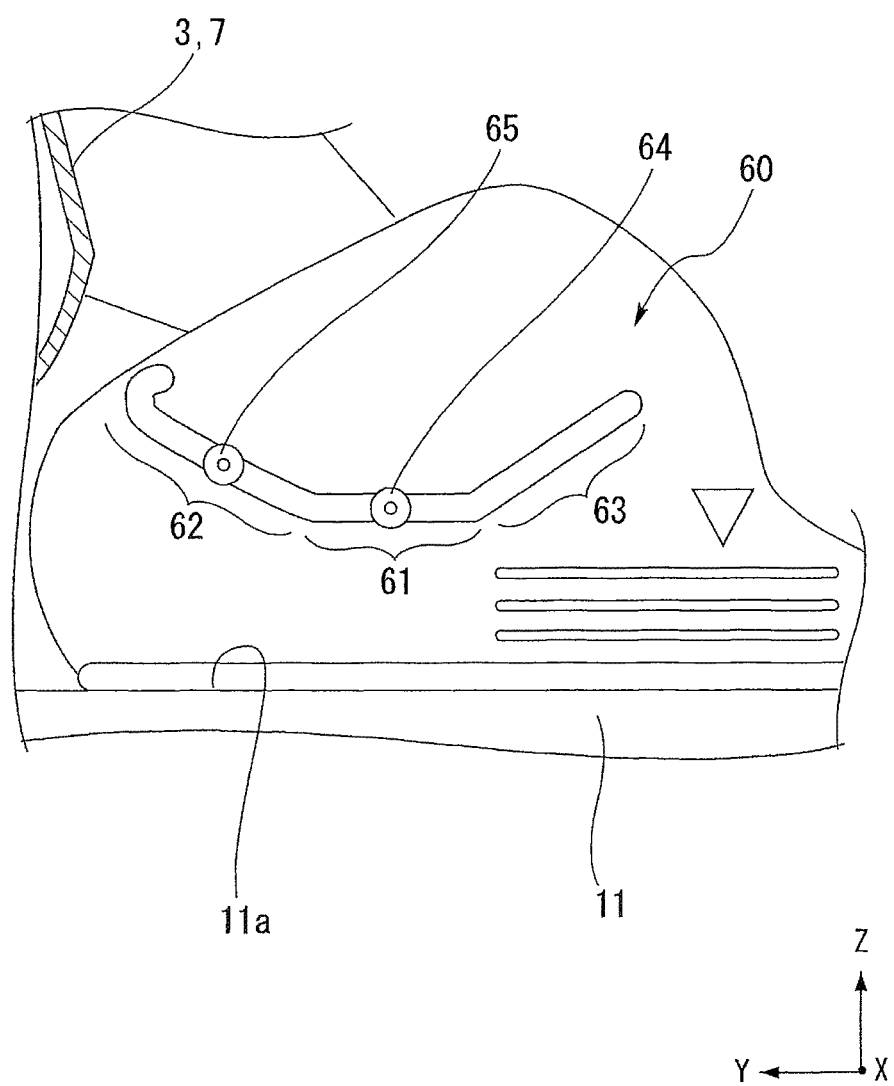
FIG. 9 is a schematic side view illustrating a sheet number limiter of a medium feeder according to a fourth embodiment.

In a fourth embodiment, still another example of a sheet number limiter of a medium feeder is described with reference to FIG. 9. FIG. 9 is a schematic side view illustrating a sheet number limiter 60 of a medium feeder according to the fourth embodiment. The sheet number limiter 60 has a contact portion 61, an extension 62, and a lead portion 63. The functions of the contact portion 61, the extension 62, and the lead portion 63 are respectively the same as those of the contact portion 16, the extension 17, and the lead portion 18 of the first embodiment.

In the sheet number limiter 60, the contact portion 61 has an auxiliary roller 64, and the extension 62 has an auxiliary roller 65. Each of the auxiliary rollers 64 and 65 is rotated by the paper sheet P while keeping in contact with the paper sheet P. Since the contact portion 61 and the extension 62 respectively have the auxiliary roller 64 and the auxiliary roller 65, the friction caused when the paper sheet P being fed comes into contact with the contact portion 61 and the extension 62 can be reduced. As such, the auxiliary roller 64 and the auxiliary roller 65 reduce the friction, thus reducing the occurrence of trouble such as a misfeed.

As described above, according to the fourth embodiment, each of the contact portion 61 and the extension 62 has an auxiliary roller. Alternatively, only one of the contact portion 61 and the extension 62 may have an auxiliary roller.

While specific embodiments of the invention are described above for illustrative purposes, various modifications are possible within the scope of the invention as defined in the appended claims.

The entire disclosure of Japanese Patent Application No. 2016-054956, filed Mar. 18, 2016 is expressly incorporated by reference herein.

What is claimed is:

1. A medium feeder comprising:
   a housing;
   a feed roller provided in the housing to feed a medium;
   a medium mounter provided upstream of the feed roller and having a mounting surface on which a plurality of the media is placed, the feed roller drawing one-by-one from the plurality of the media in order of nearest to farthest from the mounting surface of the medium mounter;
   a pair of edge guides provided at the medium mounter to guide side edges of the medium in a direction that intersects with a feeding direction in which the medium is fed; and
   a sheet number limiter provided at least one of the pair of edge guides to limit a number of media mountable on the medium mounter, wherein
   the sheet number limiter includes
   a contact portion that comes into contact with a top medium of the media when the number of the media placed on the medium mounter reaches the maximum number, and
   an extension that extends from the contact portion toward the housing such that a distance between the extension and the mounting surface increases downstream.

2. The medium feeder according to claim 1, further comprising:
   a separation roller arranged in combination with the feed roller to form a nip section therebetween that separates the media from each other by nipping the medium, wherein
   the extension intersects with a tangent line at the nip section between the feed roller and the separation roller.

3. The medium feeder according to claim 2, wherein
   when the medium having the stiffness greater than a predetermined value is inserted through a gap between the housing and an end of the extension, the nip section between the feed roller and the separation roller fails to nip the front edge of the medium.

4. The medium feeder according to claim 2, wherein
   the medium having the predetermined stiffness is a card.

5. The medium feeder according to claim 2, the extension provided to prevent a rear edge of a specific medium as a card or a business card having a stiffness greater than a predetermined value from coming into contact with the extension when a front edge in a long side direction of the specific medium is nipped by the nip section.

6. The medium feeder according to claim 1, wherein
   the sheet number limiter further includes a lead portion provided upstream of the contact portion, and the lead portion has a shape that leads the medium to a space between the contact portion and the mounting surface.

7. The medium feeder according to claim 6, wherein
   the lead portion is movable.

8. The medium feeder according to claim 1, wherein
   at least one of the contact portion and the extension has an auxiliary roller that is rotatable by the medium being fed while keeping in contact with the medium.

9. An image reading apparatus comprising:
   a reader that reads a medium; and
   the medium feeder according to claim 1, wherein
   the medium feeder feeds the medium toward the reader.

* * * * *